No. 891,004.
PATENTED JUNE 16, 1908.
J. REAM.
CONVEYING APPARATUS.
APPLICATION FILED OCT. 11, 1907.
4 SHEETS—SHEET 2.
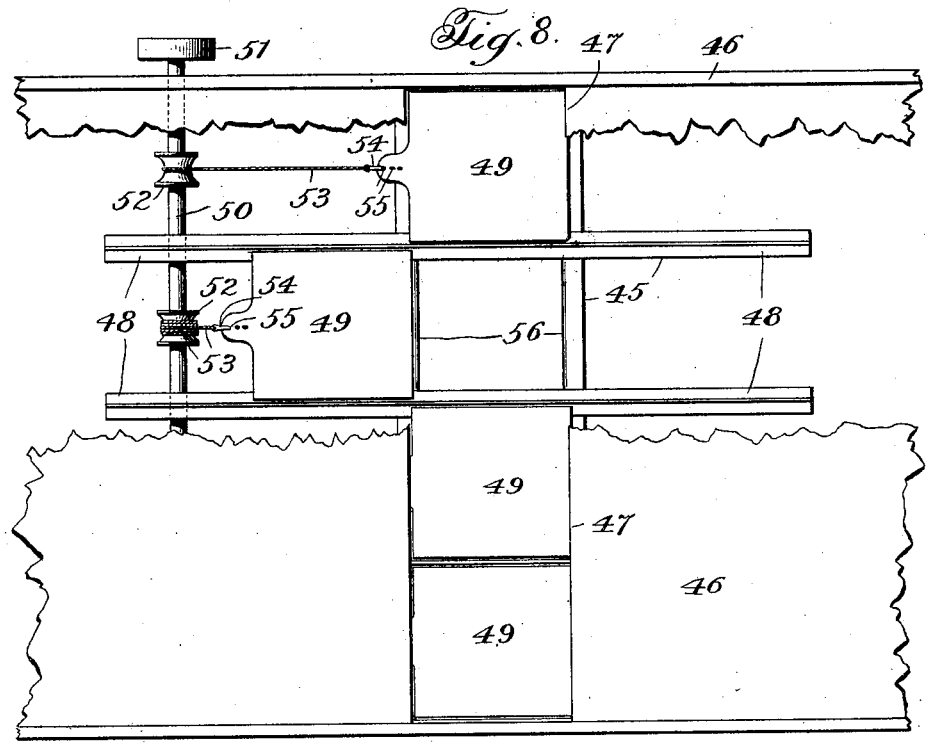
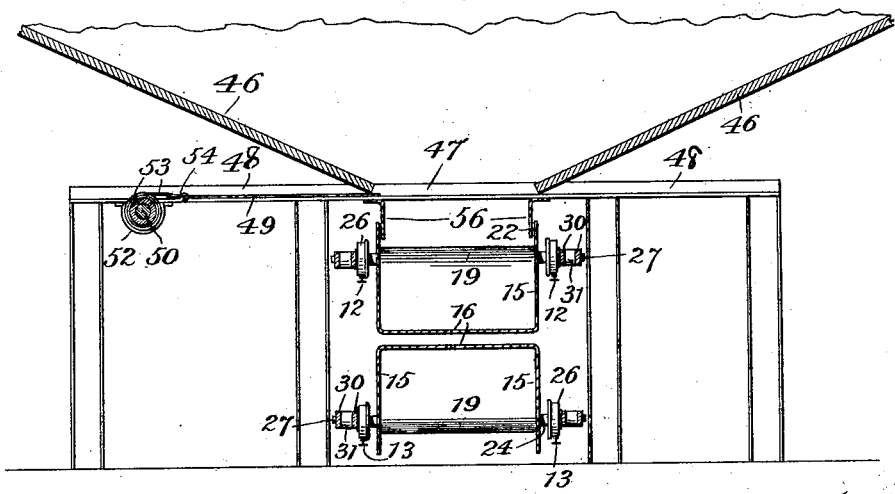

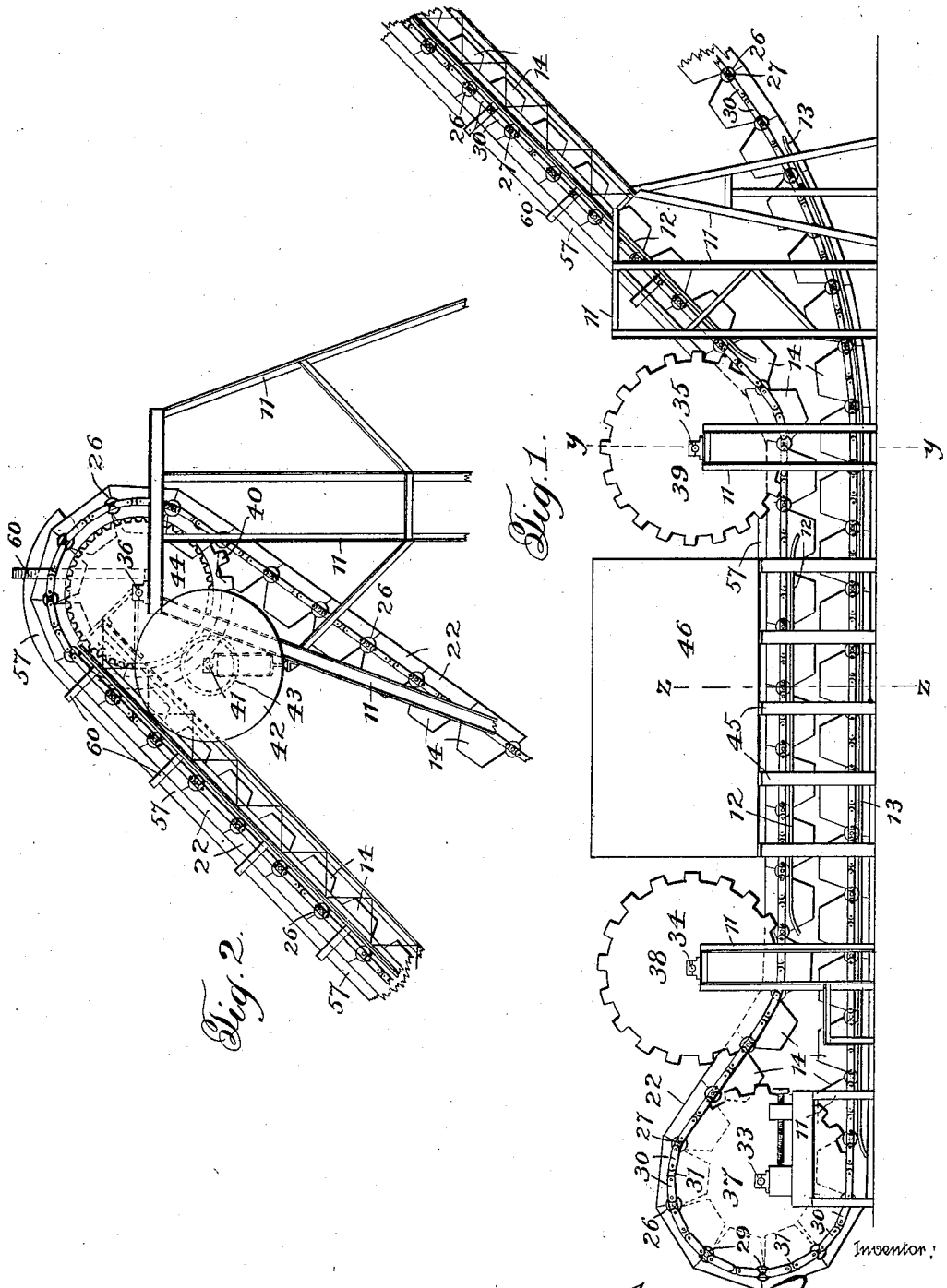

No. 891,004.
J. REAM.
CONVEYING APPARATUS.
APPLICATION FILED OCT. 11, 1907.
PATENTED JUNE 16, 1908.
4 SHEETS—SHEET 3.
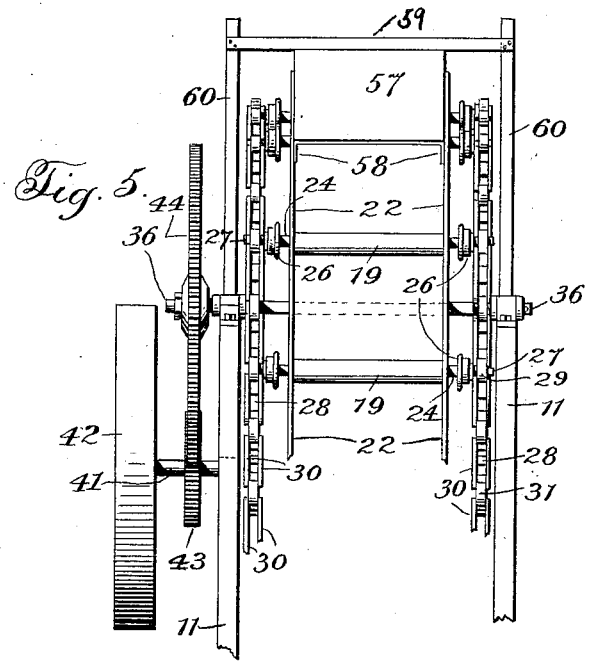
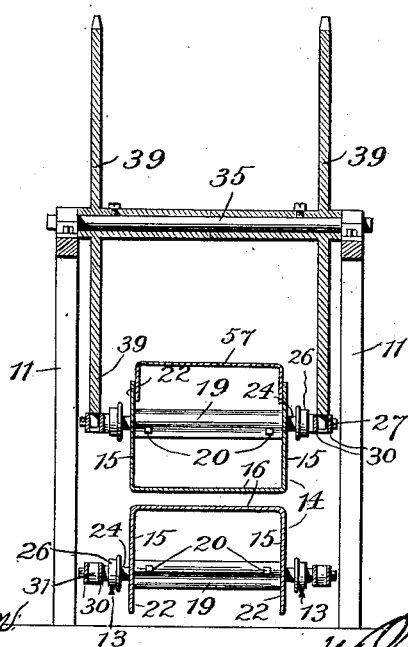

No. 891,004.
PATENTED JUNE 16, 1908.
J. REAM.
CONVEYING APPARATUS.
APPLICATION FILED OCT. 11, 1907.
4 SHEETS—SHEET 4.
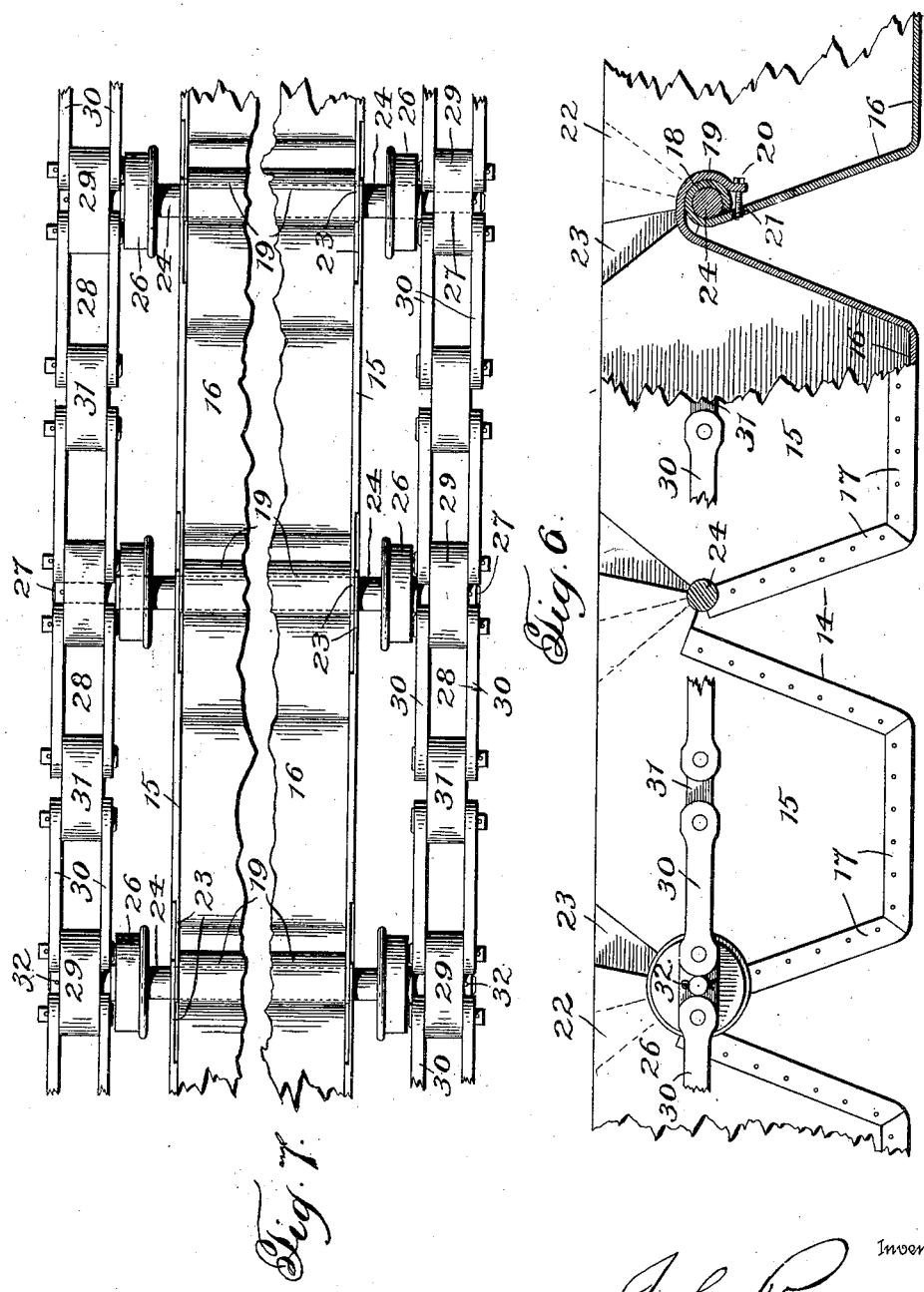

UNITED STATES PATENT OFFICE.

JOHN REAM, OF OSCEOLA, IOWA.

CONVEYING APPARATUS.

No. 891,004.     Specification of Letters Patent.    Patented June 16, 1908.

Application filed October 11, 1907. Serial No. 396,998.

*To all whom it may concern:*

Be it known that I, JOHN REAM, a citizen of the United States, residing at Osceola, in the county of Clarke and State of Iowa, have invented certain new and useful Improvements in Conveying Apparatus, of which the following is a specification.

This invention relates to conveyers wherein the carrying means for material in bulk is formed of a series of buckets. The buckets are so formed and connected together that the possibility of any material falling between them and being wasted as they pass under the delivery portion of the hopper or other source of supply is obviated.

The form of connection provided by the invention is such that the buckets are securely and strongly held together without any undue strain upon the means for maintaining the proper relation thereof, and yet they can be readily disconnected when desired. The material of the upper portions or extremities of the sides of the respective buckets is so fabricated and lapped that no edges project into and disturb the continuity of the trough. Means are also provided by the invention whereby the capacity of the bucket-formed conveyer is materially increased without unduly increasing the size thereof and without producing a cumbersome structure which will not easily and reliably pass along all points of the course of travel.

The invention further contemplates the provision of novel means whereby the material is delivered to the conveyer and heaped thereon without laterally spilling. In addition, a structure is provided which maintains the material in a heaped condition on the conveyer and prevents spilling out between the loading point and point of discharge.

The details of construction and arrangement of parts contemplated by this invention will be apparent from the detail description hereinafter, when read in connection with the accompanying drawings, forming part hereof, wherein a preferable embodiment of the improvements provided by the invention is disclosed, for purposes of illustration.

Like reference-characters refer to corresponding parts of the several views of the drawings, of which—

Figure 1 is a side view of a portion of a conveyer having my improvements embodied therein; Fig. 2 is a side view of the delivery end thereof; Fig. 3 is a transverse sectional view on the line z—z, Fig. 1; Fig. 4 is a transverse sectional view on the line y—y, Fig. 1; Fig. 5 is an end view; Fig. 6 is a fragmentary side view, with parts broken away, showing the bucket structure and the means of connecting the buckets together; Fig. 7 is a fragmentary top view of the conveyer; and Fig. 8 is a top view of the loading platform, the hopper being shown in section.

Referring more particularly to the drawings, 11 indicates upright frame members of the structure, whereon are supported various parts of the apparatus, including the going and return conveyer tracks 12 and 13, respectively.

The conveyer proper is formed of buckets or receptacles 14, comprising side portions 15 of sheet material and end and bottom portions 16, this latter portion as well being formed of sheet material which has flaps 17 bent over on and riveted to the side portions, thereby forming a complete receptacle. In each bucket the material of what is herein called for convenience the rear end, although the same may as well be the forward end, is curved over until the edge of the material abuts the end of the bucket, a hollow cylindrical-like structure 18, thereby being formed which extends entirely across the bucket. The material of the adjacent end portion of the next succeeding bucket, in a somewhat similar manner, is brought over and downwardly to form a hook portion 19 extending from side to side of the bucket and capable of disposition over portion 18, whereby the buckets are connected together.

For the purpose of preventing hook portion 19 riding off portion 18, one or more screw-threaded pins 20 are disposed through screw-threaded apertures in hook portion 19, the same being capable of engagement with the under part of portion 18, and preventing disconnection of the buckets in an obvious manner. The screw-threaded formation of the pins permits their insertion and removal and adjustment in place. In order that relative movements of the buckets and thereby the flexibility of the conveyer may not be limited by the engagement of the ends of pins 20 against the bucket-ends, for each pin a slot 21 is formed in each bucket end, through which the pins may project when required by the movements of the conveyer.

The sides 15 of each bucket are formed with extensions 22 above portions 18 and with backwardly extending flaps 23 overlapping the inside surface of extension 22 of the next succeeding bucket, a continuous trough being thereby formed which is not broken during any turning movements of the conveyer over guiding-wheels or along any other portions of the path of travel. The material of extensions 22 and flaps 23, where they lap to form tight connection, is sufficiently reduced in thickness that the trough sides at the lapped portions are no thicker than at other places, as clearly shown in Figs. 6 and 7, whereby no free edges or ends project into the trough.

For the purpose of supporting the conveyer on tracks 12 and 13, through each portion 18 is disposed an axle 24, on the spindles 25 of which are journaled traction-wheels 26, adapted to travel on the tracks. Each end of axle 24 is extended outwardly from the traction wheel to form a journal 27. The axles are connected together on each side, by a sprocket chain 28, formed of journaled links 29 on journals 27, straps 30, and connecting-links 31. Links 29 are held on journals 27 by cotter-pins or any other suitable retaining means 32. To these chains is applied the force required to move the conveyer, and they sustain the resultant pulling strain thereon and the strain caused by the weight of the conveyer and its load, and relieve the series of buckets of these strains. The sprocket-chains being formed of comparatively short sections, the easy movement of the conveyer over wheels and elsewhere is insured, and the banging of any of the parts obviated.

In the framework of the apparatus are journaled shafts 33 at the returning end of the conveyer, 34 and 35, intermediate the ends, and 36 at the delivery end. For the purpose of guiding the conveyer and holding it in proper position in different parts of its travel, there are respectively mounted on these shafts sprocket-wheels 37, 38, 39, and 40, which mesh with the sprocket-chains. These wheels are disposed on each side of the series of buckets, and not extending over the buckets, they in no way interfere with the load piled on the conveyer.

For the purpose of actuating the conveyer, a shaft 41 is journaled in the framework, and to shaft 41 is attached a belt or any other suitable power wheel 42, which is rotated from any suitable source of power. On shaft 41 is mounted a gear-wheel 43, which meshes with a gear-wheel 44 on shaft 36, whereby motion is transmitted to that shaft and to sprocket-wheels 40 and motion imparted to the conveyer. Power is applied to the conveyer at its delivery end for the reason that this is the end of the loaded portion thereof and the necessity of pulling any of the load through power exerted through an empty portion of the conveyer, which would be the case if the power was applied at any other point, is obviated.

Supported on the framework over the conveyer and between wheels 38 and 39 is a loading-platform 45, whereon is a hopper 46. This hopper has a continuous opening 47 extending entirely or nearly from end to end thereof and of about the width of the buckets in the conveyer. Slides 48 are positioned on platform 45 and across opening 47, and in these slides are doors or gates 49, which are arranged to be moved to open or close the opening, the size of the opening and thereby feed of material from the hopper through the opening to the conveyer being controlled by the number of doors open at one time.

Journaled on platform 45 in any suitable manner is a shaft 50, having a power-wheel 51 thereon and sheaves 52, one opposite each door 49. These sheaves are arranged to be engaged with a timber-hitch or in any other suitable manner by a chain, cable, or other suitable flexible means 53, which has a hook 54 thereon arranged to be hooked through an aperture 55 in the door end. When it is desired to open a door, shaft 50 being caused to rotate by power-wheel 51 actuated from any suitable source of power, the chain or cable 53 is hooked on the door and entwined around the complementary sheave 52, when the door will be pulled open in an obvious manner.

Attached to and depending downwardly from platform 45 on each side of and extending throughout the entire length of opening 47 is an apron 56, which extends into and engages the extended sides 22 of the buckets 14. The purpose of this apron is to prevent spilling of material over the sides of the conveyer during the passage of the buckets under the opening of the hopper.

In order that material heaped upon the conveyer may be retained thereon during movement from the loading point to point of discharge, a hood 57 is provided which extends from the end of the hopper-opening over the conveyer to the discharge end thereof, thus forming a continuous conduit. The sides 58 of this hood depend into and engage the extended sides 22 of the buckets in much the same manner as apron 55, these sides practically forming a continuation of the apron. The hood is attached to transverse members 59 supported on uprights 60 rising from the framework of the apparatus.

Having thus described my invention, what I claim as new, and desire to secure by Letters Patent, is—

1. In a conveyer, a series of receptacles, the edge of one receptacle overlapping the edge of the adjacent receptacle, whereby the receptacles are connected together, and means on one receptacle capable of engagement with another receptacle, whereby the receptacles are maintained in connected relation.

2. In a conveyer, a series of buckets, the edge of one bucket overlapping the edge of the adjacent bucket, whereby the buckets are held together, and a pin on one bucket and capable of engagement with the other bucket, whereby the buckets are maintained in connected relation.

3. In a conveyer, a series of buckets, the edge of one bucket overlapping the edge of the adjacent bucket, whereby the buckets are held together, and a pin on one bucket and capable of engagement with the other bucket and of passing through a slot in said latter bucket, whereby the buckets are maintained in connected relation and free relative movements thereof permitted.

4. In a conveyer, a series of buckets, the material of the end of one bucket being bent over to form a cylindrical-like structure, a hook portion on the next succeeding bucket capable of engagement with said cylindrical-like structure, and means on said hook portion whereby the buckets are maintained in connected relation.

5. In a conveyer, a series of buckets, the material of the end of one bucket being bent over to form a cylindrical-like structure, a hook portion on the next succeeding bucket capable of engagement with said cylindrical-like structure, and a pin on said hook portion whereby the buckets are maintained in connected relation.

6. In a conveyer, a series of buckets, the material of the end of one bucket being bent over to form a cylindrical-like structure, a hook portion on the next succeeding bucket capable of engagement with said cylindrical-like structure, and an adjustable pin on said hook portion whereby the buckets are maintained in connected relation.

7. In a conveyer, a series of buckets, the material of the end of one bucket having a slot therein and being bent over to form a cylindrical-like structure, a hook portion on the next succeeding bucket capable of engagement with said cylindrical-like structure, and a pin on said hook portion whereby the buckets are maintained in connected relation, said pin being capable of movement in said slot.

8. In a conveying apparatus, the combination with a trough-like conveyer and a hopper having an opening to the conveyer, of an apron extending from said opening into said conveyer and engaging the sides thereof.

9. A conveying apparatus comprising a conveyer, uprights on each side thereof, transverse members supported on said uprights above said conveyer, and a hood supported on said transverse members and extending into said conveyer.

In testimony whereof I affix my signature, in presence of two witnesses.

JOHN REAM.

Witnesses:
EDWARD Z. MANGUM,
J. M. GRAY.